's Patent [19]

United States Patent [19]
Weaver

[11] Patent Number: 4,928,526
[45] Date of Patent: May 29, 1990

[54] UNIVERSAL FUEL SENDER

[75] Inventor: Frank C. Weaver, Chicago, Ill.

[73] Assignee: Stewart Warner Instrument Corporation, Chicago, Ill.

[21] Appl. No.: 277,292

[22] Filed: Nov. 29, 1988

[51] Int. Cl.⁵ .............................................. G01F 23/36
[52] U.S. Cl. ........................................ 73/313; 73/317; 338/33
[58] Field of Search ..................... 73/313, 317, 318; 116/229; 200/84 A, 84 B; 338/33; 340/625

[56] References Cited
U.S. PATENT DOCUMENTS

| | | | |
|---|---|---|---|
| 714,377 | 11/1902 | Jeavons | 73/317 |
| 3,200,646 | 8/1965 | Donko et al. | 73/317 |
| 4,557,144 | 12/1985 | Lucchini | 73/313 |
| 4,671,121 | 6/1987 | Schieler | 73/317 |
| 4,807,472 | 2/1989 | Brown et al. | 73/313 |

Primary Examiner—William A. Cuchlinski, Jr.
Assistant Examiner—W. Morris Worth
Attorney, Agent, or Firm—Lorusso & Loud

[57] ABSTRACT

A universal fuel sender where critical dimensions are determined at final assembly including a circular support rod carrying an adjustable rheostat bracket with the radius of a float arm assembly being selectable when attached to the rheostat.

4 Claims, 4 Drawing Sheets

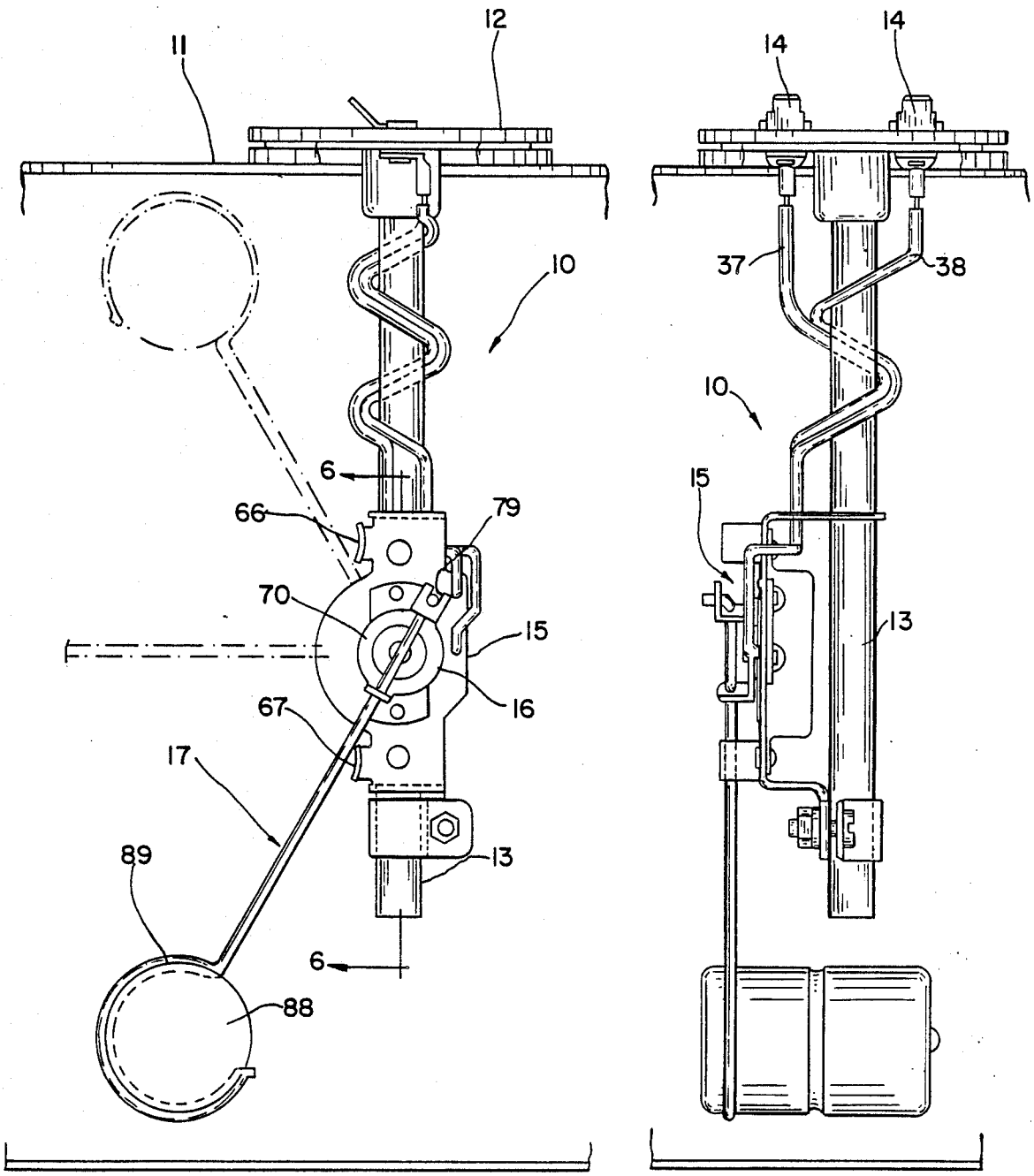

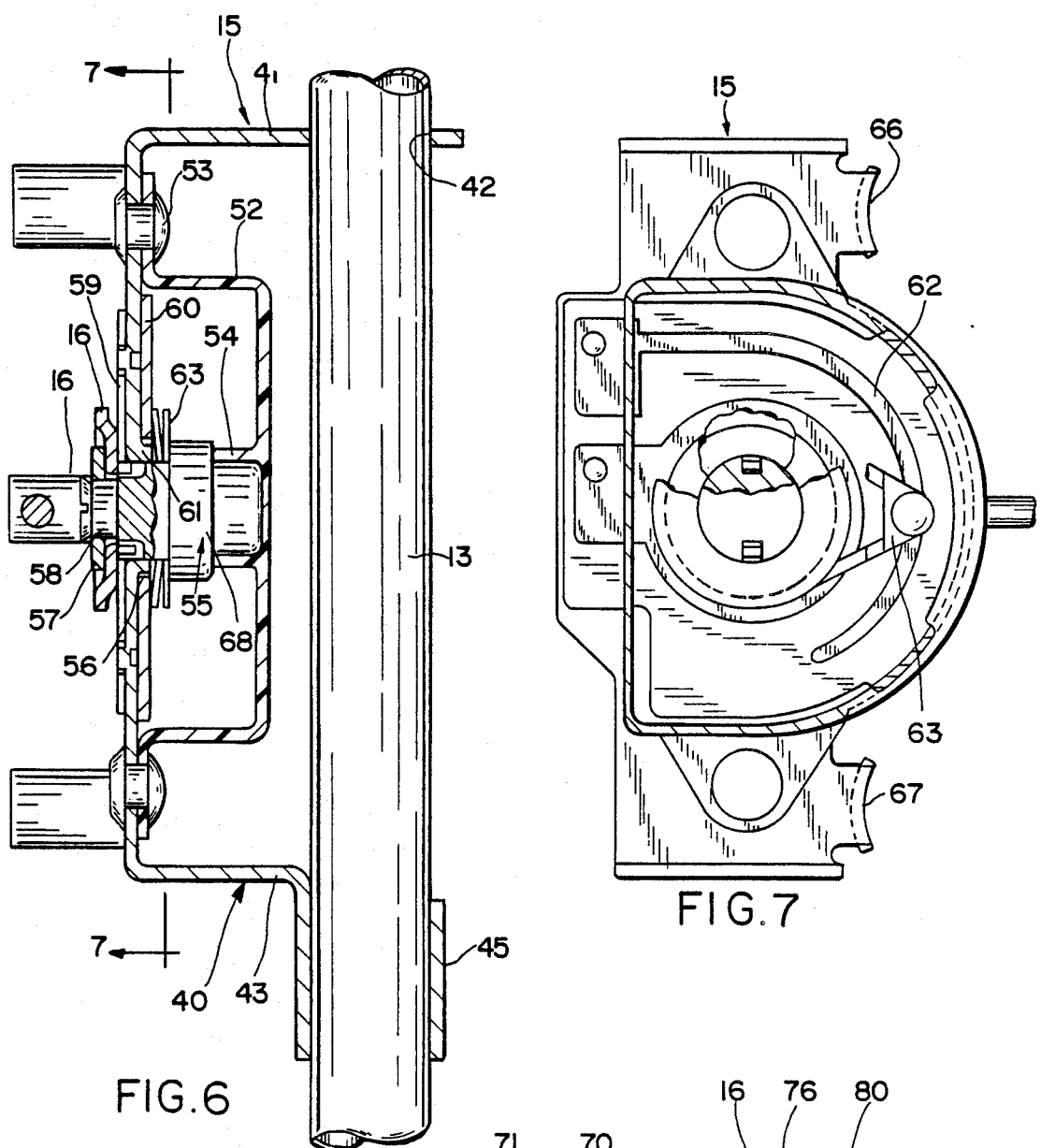
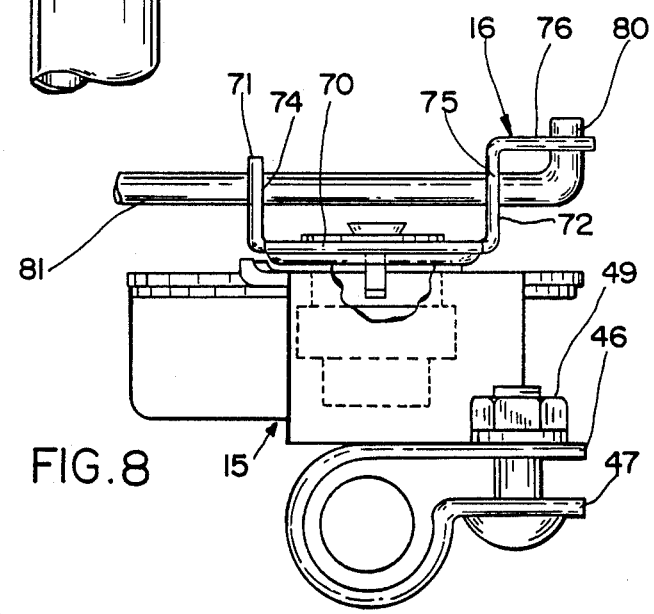
FIG. 6
FIG. 7
FIG. 8

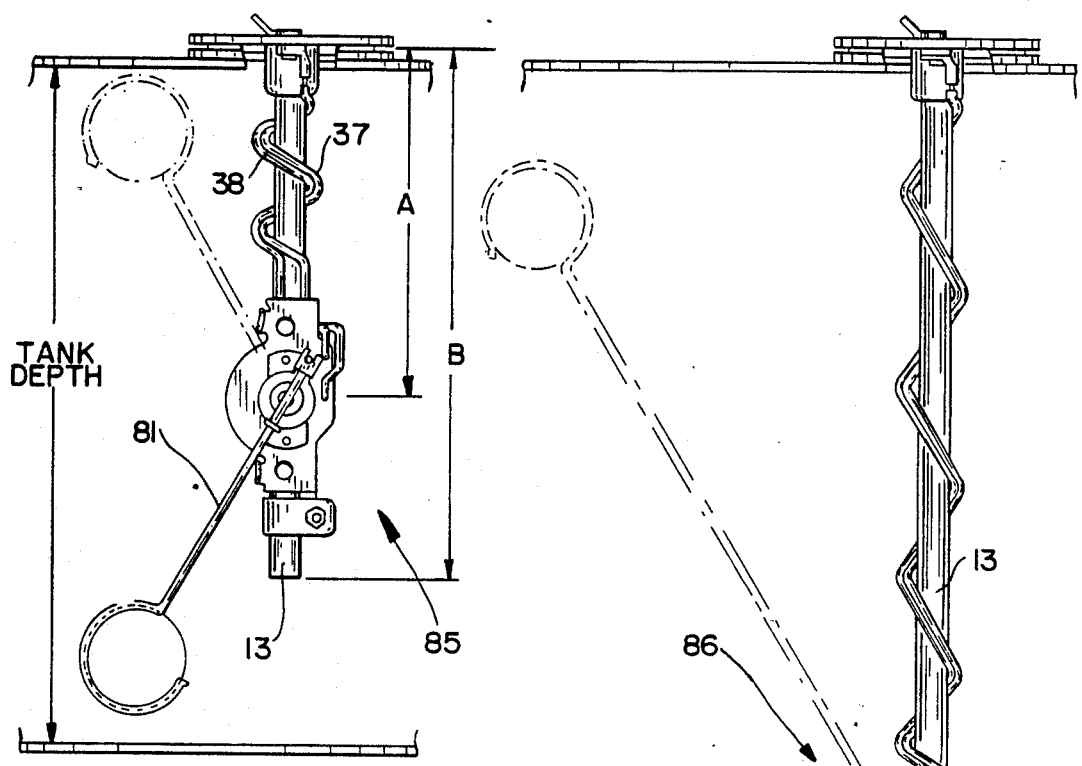
FIG. 9
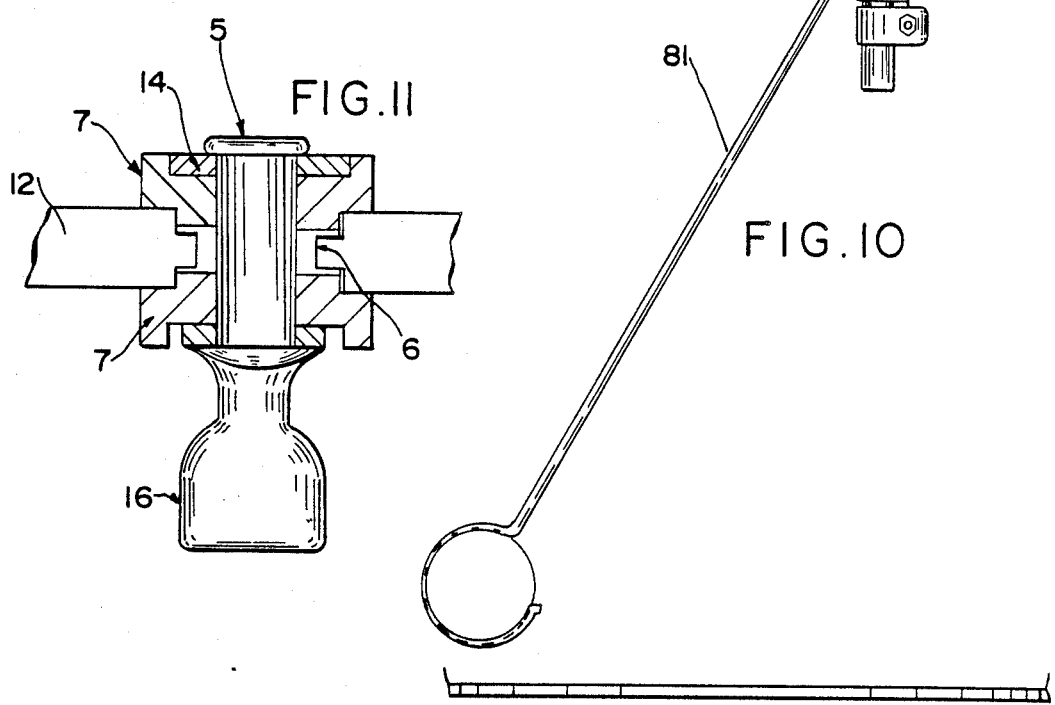
FIG. 11
FIG. 10

UNIVERSAL FUEL SENDER

BACKGROUND OF THE INVENTION

Fuel senders, as they are commonly called, are actually transducers that convert the level of fuel in a fuel tank to an electric signal to proportionally drive a visually readable electric instrument, such as a bi-torque gauge. These fuel senders conventionally include a float carried on the end of a long pivoting arm suspended within the interior of the fuel supply tank, and this arm pivots a short wiper assembly having a ball contact slidably engaging the wires on a wound wire rheostat that varies in resistance in accordance with the position of the float and, hence, liquid level, however, not always in directly proportional fashion. The angular position of the pivoting float arm, more particularly the incremental angle of the arm, is not directly proportional to a vertical incremental change in float position and, hence, not directly proportional to liquid level. Moreover, in some cases the instrument itself is not proportional throughout its range and requires some compensation. The rheostat, and more particularly the wire conductive windings of the rheostat, provides a convenient location for compensating for the non-linearity in one or two, or both ways. The first is to vary the space between the wire turns and, more specifically, by increasing the wire turn spacing the ratio of resistance change to float arm angle change decreases, and conversely, it increases with more tightly wound turns. Another common way of varying linearity is to change the individual turn lengths by varying the shape of the support board on which the wire is wound. One common shape variation includes a tapered section in the form of a frusto-isosceles triangle.

There are five critical dimensions in the design of an appropriate fuel sender for a particular size fuel tank. These dimensions are tank depth, float arm radius, the depth of the axis of rotation of the float arm, the length of the frame that supports the rheostat in the tank, and the conductor wire lengths extending between terminals at the top of the sender and the rheostat. The latter four dimensions, however, are all controlled by the former, namely the depth of the tank. For example, in one exemplary fuel sender for a tank depth of 6 inches, the float arm radius is 2.31 inches, the pivotal axis of the rheostat is 3.19 inches, the length of the support for the rheostat is 5 inches, and the wire length of 5.25 inches. For a similar rheostat and a tank depth of 26 inches, the float arm radius is 13.86 inches, the rheostat pivot axis dimension is 13.19 inches, the length of the support frame for the rheostat is 15 inches, and the wire length is 15.25 inches.

It can be readily seen from this that if a manufacturer is to accommodate tank depths form 6 inches to 26 inches at ½ inch intervals, it would have to manufacture 41 different fuel senders. The tooling and manufacturing costs to manufacture this array of fuel senders is quite costly, and therefore, it has been found desirable to design a fuel sender in which the same parts can be used in making fuel senders having significantly varying critical dimensions.

It is a primary object of the present invention to ameliorate the problems noted above in the manufacture of fuel senders for different depth tanks.

SUMMARY OF THE PRESENT INVENTION

In accordance with the present invention, a universal fuel sender is provided to accommodate differing tank depths in which the critical dimensions are determined only at final assembly, and the same parts are utilized regardless of tank depth. This enables the manufacturer to inventory standard length or size parts and assemble the parts to a particular customer's purchase order only after that purchase order is received. It also permits some customers to purchase the fuel senders partly assembled and determine the critical dimensions at its own assembly operation. For example, a fuel tank manufacturer could purchase the partly assembled fuel senders from the sender manufacturer and assemble them at its own location, varying the critical dimensions, as desired, to accommodate the tank manufacturer's varying tank sizes. He would be assisted in this with a chart provided by the sender manufacturer showing him the four critical dimensions or each tank depth in ½ inch increments.

Toward these ends, the present universal fuel sender consists of a straight extruded plastic or metal 5/8 inch support rod for the rheostat assembly that can be inventoried in 12 or 15 foot lengths and not cut until the final assembly operation. The rheostat assembly includes a generally U-shaped bracket with spaced apertures that slide up and down on the rod permitting the bracket to be vertically located on the rod in any position. The rheostat itself is a thick film resistor rheostat whose wiper is driven by a float arm plate that permits a straight float arm of indeterminate length to be passed through the plate, bent and then crimped into position to determine the radius of the float arm at the time it is assembled to the float arm plate.

Using this universal fuel sender system, the manufacturer inventories float arms having the maximum 15 inch length and then bends and cuts them for assembly to the float arm plate that the customer has ordered. The plastic or metal support rods are inventoried in standard 12 or 15 foot lengths and, of course, the conductors are on spools. The same rheostat assembly is usable for all size senders. With this system the manufacturer can assemble the senders to the specific critical dimensions only after the customer's order is received, and this eliminates inventorying fuel senders having fixed critical dimensions that may or may not be in the size-quantity mix desired in the marketplace. It also permits some customers to alternatively purchase the senders partly assembled; i.e., without the support rod fixed to the top plate, with the rheostat assembly off the support rod, and with the float arms unassembled to the rheostat assembly.

The purchaser then, can cut the support rod to the desired length, mount the rheostat assembly to the support rod at the rheostat. This gives the customer increased flexibility because the customer does not have to determine the critical dimensions of the fuel sender at the time he purchases its component parts.

BRIEF DESCRIPTION OF THE DRAWINGS

FIG. 1 is a front view of a fuel sender according to the present invention mounted in fragmented tank FIG 2 is a side view of the fuel sender illustrated in FIG. 1

FIG. 6 is an enlarged longitudinal section of the rheostat assembly taken generally along line 6—6 of FIG. 1

FIG. 7 is a cross-section of the rheostat assembly taken generally along line 7—7 of FIG. 6;

FIG. 8 is a bottom view of the rheostat assembly showing the method of attaching the float arm to the float arm plate FIGS. 9 and 10 illustrate two rheostats according to the present invention each having dramatically different critical dimensions using the same components.

FIG. 11 illustrates the construction of the terminal assemblies mounted to the top plate.

DETAILED DESCRIPTION OF THE PREFERRED EMBODIMENT

Figure 3:
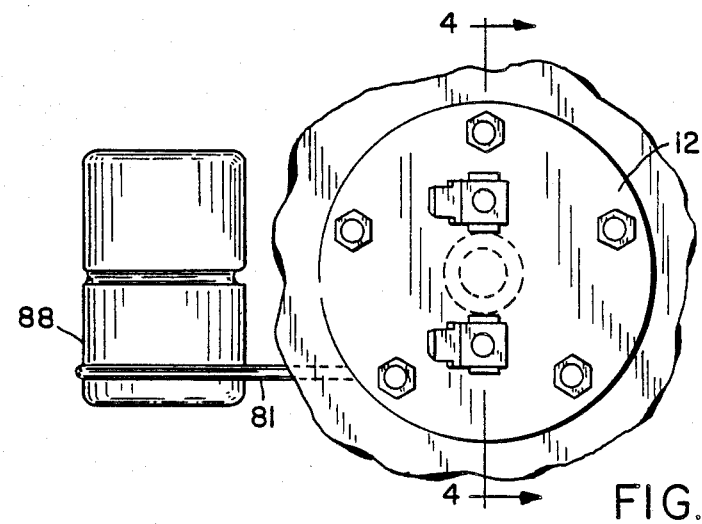
FIG. 3 is a top view of the present fuel sender showing the top plate mounted on a fragmented tank top wall

Viewing the drawings, and particularly FIGS. 1 and 2, a fuel sender assembly 10 is illustrated according to the present invention, suspended within a fuel tank 11. The present fuel sender 10 is adapted to have varying critical dimensions and accommodate a wide variety of fuel tank depths with the same sub-assemblies and a small labor cost increment.

Fuel sender 10 generally includes a top plate 12 having spaced terminals 14 therein, a plastic or metal support rod 13, a rheostat assembly 15 driven by a rotatable float arm plate 16, and a float arm assembly 17.

Figure 4:
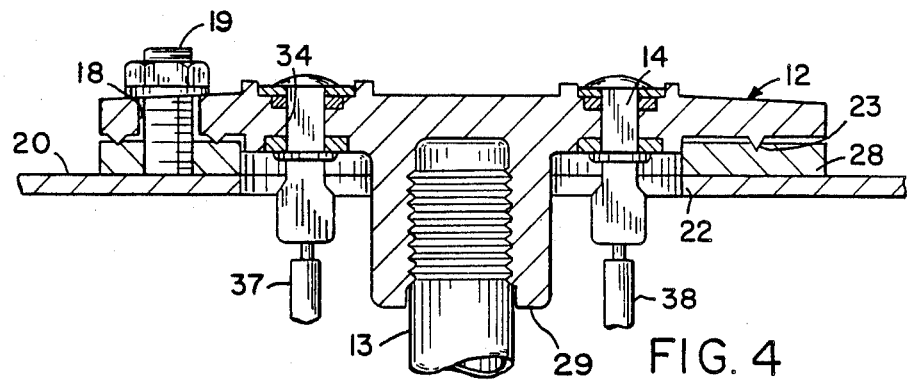
FIG. 4 is an enlarged cross-section of the top plate taken generally along line 4—4 of FIG. 3
Figure 5:
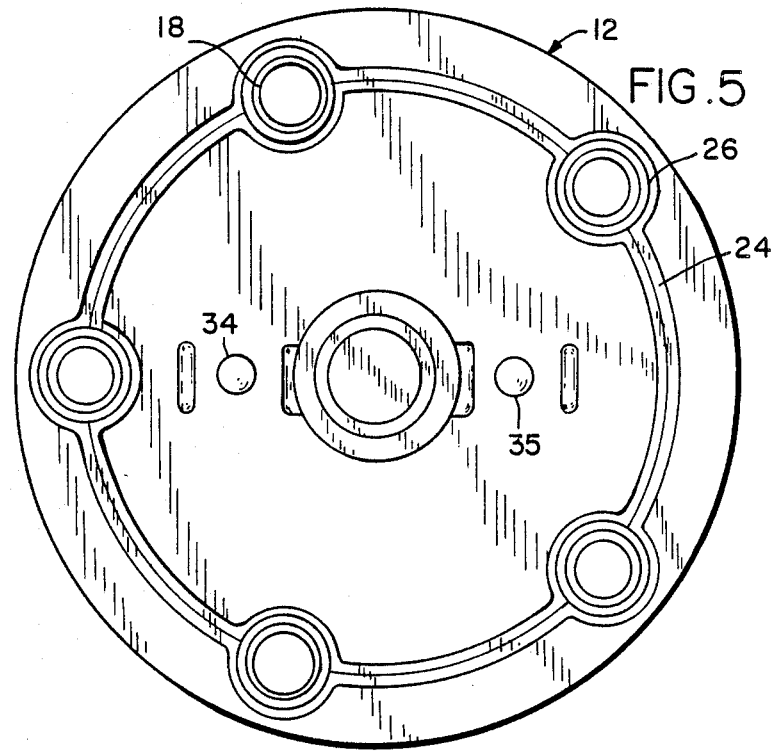
FIG. 5 is an enlarged bottom view of a sub-assembly of the top plate subassembly illustrated in FIG. 4

As seen in FIGS. 4 and 5, the top plate 12 is circular in configuration and has five spaced apertures 18 in annular array that receive fasteners 19 welded to tank top wall 20 that hold the entire sender assembly 10 in positions suspended within the tank through a circular aperture 22 in tank top wall 20. The lower surface of top plate 12 has a knife edge annular flange 23 illustrated clearly in FIGS. 4 and 5 that has annular sub-portions 26 that extend around apertures 18, and this knife edge projection 23 engages a flat rubber gasket 28 to securely seal the tank opening 22.

The top plate 12 has a central lower annular projection 29 with a threaded central opening 30 therein that receives the upper end of support rod 13 with a screw type fit. In an alternative embodiment which is not shown the central opening 30 and the support rod 13 are not threaded, rather the opening 30 receives with a press fit the upper end of the rod 13 with an appropriate locking adhesive.

The support rod 13 is a 5/8 inch plastic or metal rod that can conveniently be inventoried in 12 or 15 foot lengths.

Top plate 12 also has spaced apertures 34 and 35 therein that receive the terminal assemblies 14, the positive and ground terminals for the fuel sender. Terminals 16 are soldered to insulated conductors 37 and 38. The terminal assembly 14 shown in FIG. 11 is attached to top plate by rivet 5. Rubber insulation 6 and plastic insulation 7 prevent the terminal from shortening out.

The rheostat assembly 15 is illustrated more clearly in FIGS. 6, 7 and 8, and is seen to include a generally U-shaped mounting bracket 40 having an upper arm 41 with a circular aperture 42 slidably received on support rod 13 and a lower arm 43 with a generally circular extension 45 that extends complementary to and around support rod 13 and that is in effect a split clamping ring with flanges 46 and 47 (FIG. 8) that when compressed by short fastener 49 clamp extension 45 around the support rod 13 to lock the bracket in the desired vertical position.

The rheostat assembly includes a cup-shaped housing 52 fixed to the inside of bracket 40 by rivets 53, and it has a central projection 54 that forms a bearing for a stepped shaft 55 biased by a Belleville spring 56 into boss 54. The outer end of shaft 55 has a reduced portion 58 staked over a washer 57, float arm plate 16, and a slipper plate 59. A resistor substrate 60 is mounted around a central annular flange 61 on the rear of the mounting bracket 15, and it has a thick film resistor 62 applied to its exposed surface, engaged by a wiper arm 63 seen clearly in FIG. 7 that is mounted between spring 56 and shaft enlarged portion 68. Spring 56 assists in eliminating any play between the shaft reduced portion 58, washer 57, plate 16, slipper plate 59, and the forward face of the bracket 40. The bracket 40 also has spaced stops 66 and 67 that limit the upper and lower positions of the float arm assembly 17. The float arm assembly 17 includes a plastic cylindrical float 88 having an integral groove 89 therein that receives a spring loop on the end of the support rod 81.

As seen in FIGS. 1, 2, 6 and 8, the float arm plate 16 has a cylindrical central portion 70 with upstanding diametral projections 71 and 72 thereon with aligned float arm receiving apertures 74 and 75 therein. Projection 72 has an outwardly extending split flange 76 therein with a U-shaped slot 79 (FIG. 1) that receives an up-turned end 80 on float arm wire 81.

During assembly, the float arm 81 with its free end unbent at 80 is passed through aligned apertures 74 and 75, the end 80 is then bent at 90 degrees, pressed into slot 79 and then flange 76 is crimped around end 80 thereby locking wire 81 both axially and rotationally with respect to apertures 74 and 75 and hence float arm plate 16.

As can be seen from a comparison of FIGS. 9 and 10 illustrating sender assemblies 85 and 86 respectively, the present universal sender can be easily made in dramatically different sizes simply by varying the length B of the support rod 13, varying the dimension A, representing the depth of the center of the rheostat wiper, varying the length of conductors 37 and 38, and varying the length of the float arm wire 81. The dimensions A, B and the conductor length are given for a variety of tank depths in a chart provided by the sender manufacturer.

What is claimed is:

1. A universal fuel sender adapted to be mounted within a fuel tank, comprising;
    a top plate adapted to be fastened over an opening in the fuel tank,
    a support rod having an axially uniform cross-section so that it may be manufactured in long lengths,
    means for attaching said support rod to said top plate so that said support rod extends into the fuel tank,
    a substantially U-shaped rheostat mounting bracket having a pair of spaced rod receiving openings therein each having a shape complementary to the rod cross-section so that the mounting bracket is adjustable to any desired position along the rod, said mounting bracket defining a pocket facing said rod,
    means for adjustably clamping the bracket to the rod,
    a rheostat comprising a pivotally moveable wiper arm and a generally arcuate thick film resistor applied to a substrate, said wiper arm and said substrate being mounted on the mounting bracket within said pocket, and a float arm assembly means for driving said rheostat including at least a float arm wire and a float, said float arm wire being connected to said wiper arm and pivotally mounted to said mounting bracket so as to be pivotable in a plane parallel to said substrate concentrically with said thick film resistor, said float being arranged on a distal end of said float arm wire so that movement of said float causes the float arm wire to pivot and drive the wiper arm of said rheostat.

2. A universal fuel sender adapted to be mounted within a fuel tank as defined in claim 1, wherein the float arm assembly means further includes a flat arm plate connected to drive the wiper arm of said rheostat and adapted to receive the float arm wire, said float arm plate having a pair of axially aligned openings therein adapted to receive a straight float arm wire so that the length of the float arm wire can be determined at assembly of the float arm wire to the float arm plate, said float arm plate having means to rotationally lock the float arm wire.

3. A universal fuel sender adapted to be mounted within a fuel tank as defined in claim 2, wherein the means to rotationally lock the float arm wire on the float arm plate includes a third wire receiving opening in the plate positioned generally 90 degrees with respect to other apertures in the float arm plate.

4. A universal fuel sender adapted to be mounted within a fuel tank as defined in claim 1, wherein the support rod has a uniform circular cross-section and the apertures in the mounting bracket are generally circular.

* * * * *